United States Patent
Luo et al.

(10) Patent No.: US 7,629,197 B2
(45) Date of Patent: Dec. 8, 2009

(54) SPATIAL LIGHT MODULATOR

(75) Inventors: Qi Luo, Cupertino, CA (US); Qiuxian Tai, Cupertino, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 87 days.

(21) Appl. No.: 11/539,630

(22) Filed: Oct. 18, 2006

(65) Prior Publication Data

US 2008/0094690 A1    Apr. 24, 2008

(51) Int. Cl.
*H01L 21/00* (2006.01)
*H01L 31/00* (2006.01)

(52) U.S. Cl. .................................. 438/72; 257/466

(58) Field of Classification Search ................. 359/291, 359/290–295, 220–224, 320, 323, 324; 438/67, 438/72; 257/98, 466, E33.056–E33.059, 257/E25.032
See application file for complete search history.

(56) References Cited

U.S. PATENT DOCUMENTS

| | | | |
|---|---|---|---|
| 3,728,030 A | 4/1973 | Hawes | |
| 3,955,190 A | 5/1976 | Teraishi | |
| 4,087,810 A * | 5/1978 | Hung et al. | 345/206 |
| 4,403,248 A | 9/1983 | te Velde | |
| 4,441,791 A | 4/1984 | Hornbeck | |
| 4,786,128 A | 11/1988 | Birnbach | |
| 4,859,060 A | 8/1989 | Katagiri et al. | |
| 4,954,789 A | 9/1990 | Sampsell | |
| 4,956,619 A | 9/1990 | Hornbeck | |
| 4,982,184 A | 1/1991 | Kirkwood | |
| 5,014,259 A * | 5/1991 | Goldberg et al. | 369/284 |
| 5,022,745 A | 6/1991 | Zayhowski et al. | |
| 5,028,939 A | 7/1991 | Hornbeck et al. | |
| 5,091,983 A | 2/1992 | Lukosz | |
| 5,096,279 A | 3/1992 | Hornbeck et al. | |
| 5,170,283 A | 12/1992 | O'Brien et al. | |
| 5,315,370 A | 5/1994 | Bulow | |
| 5,381,232 A | 1/1995 | Van Wijk | |
| 5,471,341 A | 11/1995 | Warde et al. | |
| 5,526,172 A | 6/1996 | Kanack | |
| 5,559,358 A | 9/1996 | Burns et al. | |
| 5,636,052 A | 6/1997 | Arney et al. | |
| 5,646,729 A | 7/1997 | Koskinen et al. | |
| 5,646,768 A | 7/1997 | Kaeiyama | |

(Continued)

FOREIGN PATENT DOCUMENTS

EP    1 122 577    8/2001

(Continued)

OTHER PUBLICATIONS

Conner, "Hybrid Color Display Using Optical Interference Filter Array," SID Digest, pp. 577-580 (1993).

(Continued)

*Primary Examiner*—Calvin Lee

(57) ABSTRACT

An interferometric spatial light modulator comprises of two cavities. One is the optical resonant cavity having a partially reflective film and a movable reflective membrane as two walls, and the other is the electromechanical actuation cavity having the movable reflective membrane and a bottom metal layer as electrodes. The spatial light modulator is built on silicon substrate and is actively addressed. A microdisplay apparatus of such spatial light modulators and a projection display system using such microdisplay are also disclosed.

21 Claims, 10 Drawing Sheets

U.S. PATENT DOCUMENTS

| | | |
|---|---|---|
| 5,661,592 A | 8/1997 | Bornstein et al. |
| 5,665,997 A | 9/1997 | Weaver et al. |
| 5,710,656 A | 1/1998 | Goosen |
| 5,786,927 A | 7/1998 | Greywall |
| 5,808,781 A | 9/1998 | Arney et al. |
| 5,818,095 A | 10/1998 | Sampsell |
| 5,825,528 A | 10/1998 | Goosen |
| 5,838,484 A | 11/1998 | Goossen |
| 5,867,302 A | 2/1999 | Fleming |
| 5,920,418 A * | 7/1999 | Shiono et al. ............... 359/246 |
| 6,002,661 A * | 12/1999 | Abe et al. .............. 369/112.01 |
| 6,028,689 A | 2/2000 | Michalicek et al. |
| 6,040,937 A | 3/2000 | Miles |
| 6,055,090 A | 4/2000 | Miles |
| 6,262,697 B1 | 7/2001 | Stephenson |
| 6,327,071 B1 | 12/2001 | Kimura |
| 6,356,378 B1 | 3/2002 | Huibers |
| 6,384,952 B1 | 5/2002 | Clark et al. |
| 6,433,917 B1 | 8/2002 | Mei et al. |
| 6,438,282 B1 | 8/2002 | Takeda et al. |
| 6,452,712 B2 | 9/2002 | Atobe et al. |
| 6,466,354 B1 | 10/2002 | Gudeman |
| 6,556,338 B2 | 4/2003 | Han et al. |
| 6,574,033 B1 | 6/2003 | Chui et al. |
| 6,597,490 B2 | 7/2003 | Tayebati |
| 6,608,268 B1 | 8/2003 | Goldsmith |
| 6,632,698 B2 | 10/2003 | Ives |
| 6,650,455 B2 | 11/2003 | Miles |
| 6,657,832 B2 | 12/2003 | Williams et al. |
| 6,661,561 B2 | 12/2003 | Fitzpatrick et al. |
| 6,674,562 B1 | 1/2004 | Miles |
| 6,680,792 B2 | 1/2004 | Miles |
| 6,698,295 B1 | 3/2004 | Sherrer |
| 6,710,908 B2 | 3/2004 | Miles et al. |
| 6,794,119 B2 | 9/2004 | Miles |
| 6,813,059 B2 | 11/2004 | Hunter et al. |
| 6,841,081 B2 | 1/2005 | Chang et al. |
| 6,844,959 B2 | 1/2005 | Huibers et al. |
| 6,867,896 B2 | 3/2005 | Miles |
| 6,870,654 B2 | 3/2005 | Lin et al. |
| 6,882,458 B2 | 4/2005 | Lin et al. |
| 6,882,461 B1 | 4/2005 | Tsai et al. |
| 6,912,022 B2 | 6/2005 | Lin et al. |
| 6,940,630 B2 | 9/2005 | Xie |
| 6,947,200 B2 | 9/2005 | Huibers |
| 6,952,303 B2 | 10/2005 | Lin et al. |
| 6,958,847 B2 | 10/2005 | Lin |
| 6,980,350 B2 | 12/2005 | Hung et al. |
| 6,983,820 B2 | 1/2006 | Tsai |
| 7,006,272 B2 | 2/2006 | Tsai |
| 7,046,422 B2 | 5/2006 | Kimura et al. |
| 7,119,945 B2 | 10/2006 | Kothari et al. |
| 7,123,216 B1 | 10/2006 | Miles |
| 7,126,738 B2 | 10/2006 | Miles |
| 7,130,104 B2 | 10/2006 | Cummings |
| 7,184,195 B2 | 2/2007 | Yang |
| 7,184,202 B2 | 2/2007 | Miles et al. |
| 7,198,873 B2 | 4/2007 | Lin et al. |
| 7,221,495 B2 | 5/2007 | Miles et al. |
| 7,236,284 B2 | 6/2007 | Miles |
| 7,256,922 B2 | 8/2007 | Chui et al. |
| 7,289,259 B2 | 10/2007 | Chui et at. |
| 7,302,157 B2 | 11/2007 | Chui |
| 7,304,784 B2 * | 12/2007 | Chui et al. ................. 359/290 |
| 7,321,456 B2 | 1/2008 | Cummings |
| 7,321,457 B2 | 1/2008 | Heald |
| 7,327,510 B2 | 2/2008 | Cummings et al. |
| 7,372,613 B2 | 5/2008 | Chui et al. |
| 7,372,619 B2 | 5/2008 | Miles |
| 7,385,744 B2 | 6/2008 | Kogut et al. |
| 7,385,762 B2 | 6/2008 | Cummings |
| 7,420,725 B2 | 9/2008 | Kothari |
| 7,460,291 B2 | 12/2008 | Sampsell et al. |
| 7,460,292 B2 | 12/2008 | Chou |
| 7,476,327 B2 | 1/2009 | Tung et al. |
| 7,492,503 B2 | 2/2009 | Chui |
| 7,527,995 B2 | 5/2009 | Sampsell |
| 7,527,998 B2 * | 5/2009 | Tung et al. ..................... 438/53 |
| 7,561,323 B2 * | 7/2009 | Gally et al. ................. 359/291 |
| 7,564,612 B2 | 7/2009 | Chui |
| 2001/0003487 A1 | 6/2001 | Miles |
| 2001/0028503 A1 | 10/2001 | Flanders et al. |
| 2001/0043171 A1 | 11/2001 | Van Gorkom et al. |
| 2002/0054424 A1 | 5/2002 | Miles |
| 2002/0070931 A1 | 6/2002 | Ishikawa |
| 2002/0075555 A1 | 6/2002 | Miles |
| 2002/0126364 A1 | 9/2002 | Miles |
| 2002/0146200 A1 | 10/2002 | Kurdle et al. |
| 2002/0149828 A1 | 10/2002 | Miles |
| 2003/0016428 A1 | 1/2003 | Kato et al. |
| 2003/0035196 A1 | 2/2003 | Walker |
| 2003/0043157 A1 | 3/2003 | Miles |
| 2003/0053078 A1 | 3/2003 | Missey et al. |
| 2003/0202265 A1 | 10/2003 | Reboa et al. |
| 2003/0202266 A1 | 10/2003 | Ring et al. |
| 2004/0008396 A1 | 1/2004 | Stappaerts |
| 2004/0008438 A1 | 1/2004 | Sato |
| 2004/0027671 A1 | 2/2004 | Wu et al. |
| 2004/0027701 A1 | 2/2004 | Ishikawa |
| 2004/0043552 A1 | 3/2004 | Strumpell et al. |
| 2004/0058532 A1 | 3/2004 | Miles et al. |
| 2004/0075967 A1 | 4/2004 | Lynch et al. |
| 2004/0080035 A1 | 4/2004 | Delapierre |
| 2004/0100594 A1 | 5/2004 | Huibers et al. |
| 2004/0100677 A1 | 5/2004 | Huibers et al. |
| 2004/0125281 A1 | 7/2004 | Lin et al. |
| 2004/0125282 A1 | 7/2004 | Lin et al. |
| 2004/0145811 A1 | 7/2004 | Lin et al. |
| 2004/0147198 A1 | 7/2004 | Lin et al. |
| 2004/0175577 A1 | 9/2004 | Lin et al. |
| 2004/0184134 A1 | 9/2004 | Makigaki |
| 2004/0207897 A1 | 10/2004 | Lin |
| 2004/0209195 A1 | 10/2004 | Lin |
| 2004/0217919 A1 | 11/2004 | Pichl et al. |
| 2004/0218251 A1 | 11/2004 | Piehl et al. |
| 2004/0240032 A1 | 12/2004 | Miles |
| 2005/0002082 A1 | 1/2005 | Miles |
| 2005/0003667 A1 | 1/2005 | Lin et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0046919 A1 | 3/2005 | Taguchi et al. |
| 2005/0046922 A1 | 3/2005 | Lin et al. |
| 2005/0046948 A1 | 3/2005 | Lin |
| 2005/0078348 A1 | 4/2005 | Lin |
| 2005/0168849 A1 | 8/2005 | Lin |
| 2005/0179378 A1 | 8/2005 | Oooka et al. |
| 2005/0195462 A1 | 9/2005 | Lin |
| 2006/0007517 A1 | 1/2006 | Tsai |
| 2006/0017379 A1 | 1/2006 | Su et al. |
| 2006/0017689 A1 | 1/2006 | Faase et al. |
| 2006/0024880 A1 | 2/2006 | Chui et al. |
| 2006/0065940 A1 | 3/2006 | Kothari |
| 2006/0066599 A1 | 3/2006 | Chui |
| 2006/0066640 A1 | 3/2006 | Kothari et al. |
| 2006/0066641 A1 | 3/2006 | Gally et al. |
| 2006/0066936 A1 | 3/2006 | Chui et al. |
| 2006/0067649 A1 | 3/2006 | Tung et al. |
| 2006/0067650 A1 | 3/2006 | Chui |
| 2006/0067651 A1 | 3/2006 | Chui |
| 2006/0077152 A1 | 4/2006 | Chui et al. |
| 2006/0077155 A1 | 4/2006 | Chui et al. |
| 2006/0077156 A1 | 4/2006 | Chui et al. |
| 2006/0079048 A1 | 4/2006 | Sampsell |

| | | | |
|---|---|---|---|
| 2006/0220160 A1 | 10/2006 | Miles | |
| 2006/0262380 A1 | 11/2006 | Miles | |
| 2006/0268388 A1 | 11/2006 | Miles | |
| 2007/0020948 A1 | 1/2007 | Piehl et al. | |
| 2007/0086078 A1 | 4/2007 | Hagood et al. | |
| 2007/0121118 A1 | 5/2007 | Gally et al. | |
| 2007/0177247 A1 | 8/2007 | Miles | |
| 2007/0189654 A1 | 8/2007 | Lasiter | |
| 2007/0194630 A1 | 8/2007 | Mignard et al. | |
| 2007/0216987 A1 | 9/2007 | Hagood et al. | |
| 2007/0279729 A1 | 12/2007 | Kothari et al. | |
| 2008/0013144 A1 | 1/2008 | Chui et al. | |
| 2008/0013145 A1 | 1/2008 | Chui et al. | |
| 2008/0037093 A1 | 2/2008 | Miles | |
| 2008/0055705 A1 | 3/2008 | Kothari | |
| 2008/0055706 A1 | 3/2008 | Chui et al. | |
| 2008/0055707 A1 | 3/2008 | Kogut et al. | |
| 2008/0080043 A1 | 4/2008 | Chui et al. | |
| 2008/0088904 A1 | 4/2008 | Miles | |
| 2008/0088910 A1 | 4/2008 | Miles | |
| 2008/0088911 A1 | 4/2008 | Miles | |
| 2008/0088912 A1 | 4/2008 | Miles | |
| 2008/0094690 A1 | 4/2008 | Luo et al. | |
| 2008/0106782 A1 | 5/2008 | Miles | |
| 2008/0110855 A1 | 5/2008 | Cummings | |
| 2008/0112035 A1 | 5/2008 | Cummings | |
| 2008/0112036 A1 | 5/2008 | Cummings | |
| 2008/0186581 A1 | 8/2008 | Bita et al. | |
| 2008/0239455 A1 | 10/2008 | Kogut et al. | |
| 2008/0247028 A1 | 10/2008 | Chui et al. | |
| 2009/0068781 A1 | 3/2009 | Tung et al. | |
| 2009/0080060 A1 | 3/2009 | Sampsell et al. | |
| 2009/0135465 A1 | 5/2009 | Chui | |

FOREIGN PATENT DOCUMENTS

| | | | |
|---|---|---|---|
| EP | 1 275 997 | 1/2003 | |
| EP | 1 473 581 | 11/2004 | |
| JP | 11211999 | 8/1999 | |
| JP | 2001-221913 | 8/2001 | |
| JP | 2002-062490 | 2/2002 | |
| JP | 2002-221678 | 8/2002 | |
| JP | 2003-340795 | 2/2003 | |
| JP | 2004-212638 | 7/2004 | |
| JP | 2004-212680 | 7/2004 | |
| JP | 2005 279831 | 10/2005 | |

OTHER PUBLICATIONS

Feenstra et al., Electrowetting displays, Liquivista BV, 16 pp., Jan. 2006.

Jerman et al., "A Miniature Fabry-Perot Interferometer with a Corrugated Silicon Diaphragm Support", (1988).

Jerman et al., "Miniature Fabry-Perot Interferometers Micromachined in Silicon for Use in Optical Fiber WDM Systems," Transducers, San Francisco, Jun. 24-27, 1991, Proceedings on the Int'l. Conf. on Solid State Sensors and Actuators, vol. CONF. 6, Jun. 24, 1991, pp. 372-375.

Kowarz et al., Conformal grating electromechanical system (GEMS) for high-speed digital light modulation, Proceedings of the IEEEE 15th. Annual International Conference on Micro Electro Mechanical Systems, MEMS 2002, pp. 568-573.

Miles, A New Reflective FPD Technology Using Interferometric Modulation, Journal of the SID, 5/4, 1997.

Miles, Interferometric modulation: MOEMS as an enabling technology for high performance reflective displays, Proceedings of SPIE, vol. 4985, pp. 131-139, 2003.

Pape et al., Characteristics of the deformable mirror device for optical information processing, Optical Engineering, 22(6):676-681, Nov.-Dec. 1983.

Taii et al., "A transparent sheet display by plastic MEMS," Journal of the SID 14(8):735-741, 2006.

\* cited by examiner

SPATIAL LIGHT MODULATOR

FIELD OF THE INVENTION

The present invention relates to spatial light modulator, and particularly to interferometric silicon spatial light modulator and the array of interferometric silicon spatial light modulators, and more particularly to microdisplays using the array of interferometric silicon spatial light modulators.

BACKGROUND OF THE INVENTION

Spatial light modulator is an electro-optical element that is electronically controlled to alter either the path or the intensity of an incident light to obtain desired output light signal. One type of the spatial light modulator is an interferometric spatial light modulator built by microelectromechanical systems (MEMS). Such spatial light modulator has two closely placed surfaces. The distance between these two surfaces may be controlled so that the system selectively absorbs or reflects light guided by the principles of optical interference, in regarding to a pre-defined way, or in regarding to commands from a driving system. Further more, with the help of MEMS technology, an array of such spatial light modulators can be integrated onto a small chip or a glass substrate, therefore realize applications in display field.

Microelectromechanical systems (MEMS) include micro mechanical elements, actuators, and electronics. The micro mechanical elements and the actuators may be created using depositing, etching, and other microfabrication processes.

MEMS-built interferometric light modulators are known from U.S. Pat. No. 5,835,255, issued to Miles, U.S. Pat. No. 6,674,562, issued to Miles for interferometric modulators of radiation. In these references, a method is provided making a spatial light modulator and a display apparatus of an array of such spatial light modulators, where the interferometric cavity gap changes spontaneously with external applied electronic signal and therefore modulates the incident light intensity. Such a typical spatial light modulator has two layers to define a cavity. One layer serves as a mirror, and one or both of the layers serve as electrodes. One layer is semitransparent to allow light pass through, to reach the surface of the second layer and get reflected there. One layer is movable relatively to the other through two or more positions upon different electrical signals applied, which causes the cavity to operate interferometrically in these positions. In one position, the movable layer is at relaxation and the spatial light modulator is at bright state; in another position, the movable layer is at actuated state and the spatial light modulator is at dark state. In these references, a type of display apparatus is also claimed, which includes an array of such interferometric modulators formed integrally on a substrate, preferably transparent, and its control circuitry connected to the array for controlling each modulator independently to switch between its bright and dark states. The display apparatus uses passive multiplexing addressing.

It would be desirable to have a compact spatial light modulator with active addressing and high contrast, and to have a display apparatus with an array of such integrated compact spatial light modulators. Such display apparatus, for example but not limited to, microdisplay, would be good for displaying large amount of information.

As easily understood by those skilled in the art, specular reflection is the nature characteristic of interferometric spatial light modulator and the display made of such modulators. This characteristic makes such a display especially favorable for projection display applications.

On the other hand, advance of integrated circuit technology has provided the foundation for active addressing of silicon-based microdisplays. Examples of such microdisplays are shown in U.S. Pat. Nos. 6,023,309 and 6,052,165, where microdisplays of liquid crystal on silicon (LCOS) are made. It is easily understood by those skilled in the art that such active addressing schemes can be adapted to the microdisplays made of spatial light modulators built on silicon substrate.

SUMMARY OF THE INVENTION

In general, it is the object of the present invention to provide a spatial light modulator that employs great contrast and active addressing. The invented spatial light modulator is designed to have two cavities, with one to control the electromechanical performance and the other to control the optical performance. They can be adjusted separately for optimal performance without interfering each other.

A further object of the invention is to provide an array of above spatial light modulators.

A further object of the invention is to provide a microdisplay apparatus that uses the array of spatial light modulators.

A further object of the invention is to provide a projection display system that uses the microdisplay apparatus that uses the array of the spatial light modulators.

An additional object of the invention is to provide an electro-optical switch apparatus and an array apparatus of such switches that uses the mentioned spatial light modulators.

In accordance with the above objects, the invention provides structural designs of such spatial light modulator and spatial light modulator array, and processes of making them. The spatial light modulator consists of two functional building blocks. One is of the MEMS electromechanical part, and the other of optical part. They may be built separately, and then join to form the spatial light modulator.

The invention also provides a wafer-scale assembly process of making the above-mentioned array of the spatial light modulators and the microdisplay apparatus. The wafer-scale assembly process includes two parallel sub-processes to form two functional substrates of the wafer assembly, which are the array substrate and the backplate substrate.

In an example embodiment, the array substrate, one of the two functional building blocks, uses a silicon backplate with integrated MOS devices and integrated routine structures. Upon the silicon backplate, an array of electrodes is made by depositing a conducting layer and patterning it thereafter. A thin layer of dielectric material is formed on the top of the electrode array. After that, a removable sacrificial layer is deposited on the top of the dielectric film. This sacrificial layer is to be removed by means of releasing or etch later. The sacrificial layer is then patterned, and a dielectric layer is deposited on the top and is then patterned to form an array of posts or an array of post walls at the corners of each electrode. A layer of reflective metal film is deposited on the top of the sacrificial layer and the formed post structures. Then, another array of post structure is formed on the top of the metal reflective film while directly sitting on the first array of post structures or walls, by depositing a dielectric layer and then patterning it. After that, the reflective metal layer is patterned to form a plurality of release holes, and through which, the sacrificial layer is then etched away by exposing the array substrate to some gaseous etchant, such as XeF2. After releasing, the functional array substrate is formed. In this process flow, it is understood that, one or more of planarization process steps, such as CMP, may be employed before some certain process steps to ensure optimal flatness.

In this example embodiment, the backplate substrate, the other functional building block, uses a transparent substrate, preferably glass, with the same shape and size as the array substrate. A thin layer of partially reflective layer, such as metal, is deposited on the top of the transparent substrate. Then, a thin layer of dielectric layer is deposited on the top of this partially reflective metal layer. After that, the functional backplate substrate is formed.

In this example embodiment, the functional array substrate and the functional backplate substrate are sealed together by a sealant material, such as epoxy, solder, in a low-pressure environment. After the environment pressure is brought back to the atmosphere, the back substrate and the array substrate will be naturally pressed against each other by the air pressure to form the spatial light modulator arrays.

DETAILED DESCRIPTION OF THE PREFERRED EMBODIMENT

The following detailed description is directed to certain specific embodiments of the invention. In the description, reference is made to the drawings wherein like parts may be assigned with like numerals throughout.

The present invention provides a spatial light modulator that modulates incident light to get desired out-going light signal, according to the pre-determined settings. In one situation, the spatial light modulator reflects a large portion of incident light to the viewer therefore forms the bright state; in another situation, it reflects effectively very little incident light and forms the dark state. Depending on the design of a spatial light modulator, its bright state can be at relaxation state or at actuated state; wherein, the relaxation state means the actuation voltage is zero or low, yet the actuated state means the actuation voltage is non-zero or high.

In one embodiment, for example, a modulator comprises of a pair of reflective layers positioned at a variable and controllable distance from each other to form a resonant optical cavity, wherein one reflective layer is highly reflective and the other is partially reflective. The highly reflective layer may be moved between two positions. In the first position, referred to herein as the relaxation position, the movable reflective layer is positioned at a relative small distance from the other partially reflective layer. In the second position, referred as the actuated position, the movable reflective layer is positioned in a relatively big distance from the partially reflective layer. Incident light gets to the partially reflective layer first, and then reaches the movable reflective layer. The light reflected from the two layers interferes constructively or destructively depending on the position of the movable layer, i.e., the gap between the two layers, producing either an allover reflective or an allover absorbing state for each modulator.

In another embodiment, a display apparatus comprises of an array of spatial light modulators. There, each spatial light modulator is treated as a display pixel element. For ease of description, two terminology terms are used below regarding the spatial light modulator. While the structure of the spatial light modulator is concerned, the term "spatial light modulator" may be used; while the spatial light modulator is treated as a display pixel element, then the term "pixel" may be used.

Figure 1A:
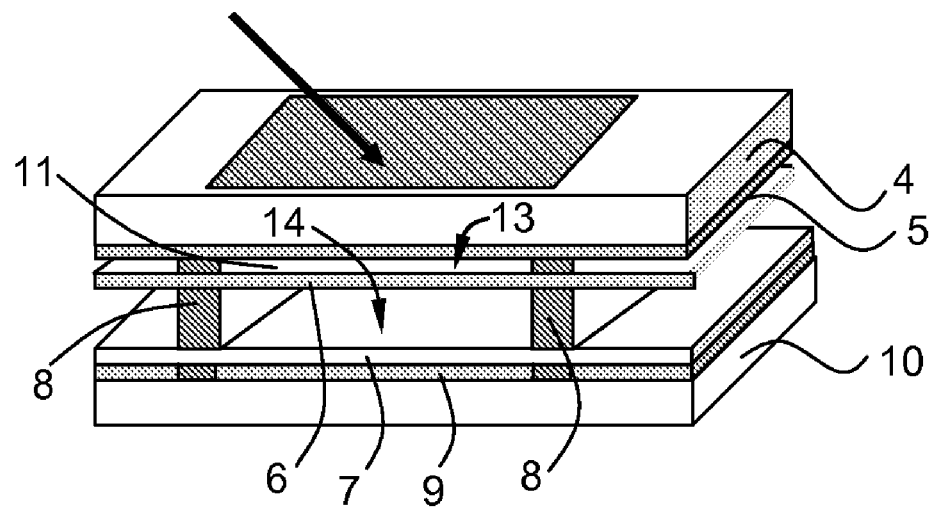
FIG. 1A is an isometric view depicting an embodiment of a spatial light modulator, in which the movable reflective layers is in a relaxed position and the spatial light modulator is at dark state.
Figure 1B:
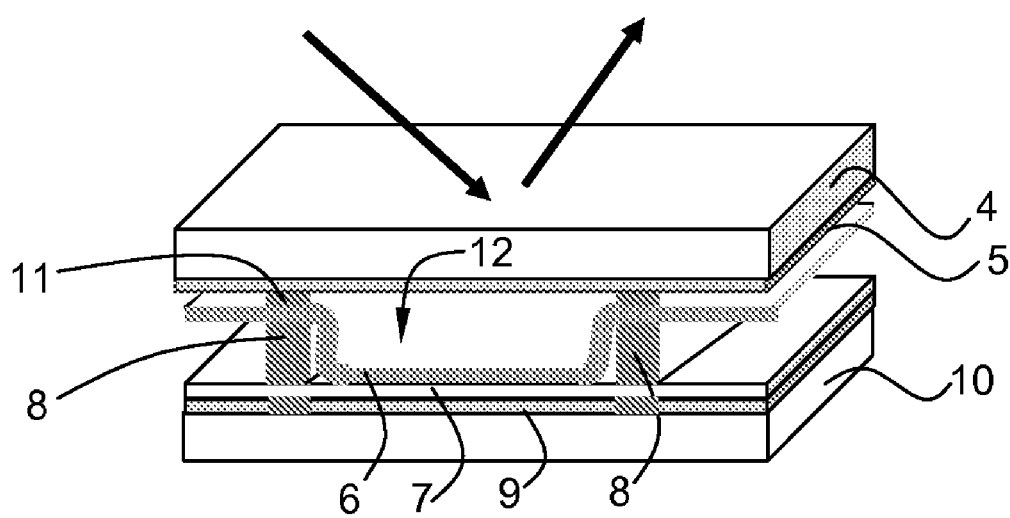
FIG. 1B is another isometric view of the spatial light modulator as in FIG. 1A, in which the movable reflective layer of the spatial light modulator is in an actuated state and the spatial light modulator is showing the bright state.

FIGS. 1A and B illustrate one embodiment of the invention, showing isometric views of an interferometric spatial light modulator 100 in a display apparatus wherein an array of such spatial light modulators is used. In FIG. 1A, the modulator is in dark state with the movable reflective layer in relaxation state. In FIG. 1B, the modulator is in bright state with its movable reflective layer being deformed due to actuation.

In detail, the spatial light modulator in the depicted portion of the array in FIG. 1 has a movable reflective layer 6. This movable reflective layer is at a predetermined distance from a partially reflective layer 5, and another predetermined distance from a dielectric layer 7. This results in two empty cavities 13 and 14. The gap of cavity 13, which is the distance between the movable reflective layer 6 and the partially reflective layer 5, is controlled by spacer 11. The gap of cavity 14, which is the distance between the movable reflective layer 6 and the dielectric layer 7, is controlled by spacer 8. The sizes of spacer 8 and 11 may be of 0.1 um to 5 um, preferably around 1 um. The gap of cavity 13, ranging from 5 nm to 100 nm, preferably around 50 nm, is optimized for dark state while the movable reflective layer 6 is at relaxation state as shown in FIG. 1A; and the gap of cavity 14, ranging from 100 nm to 1000 nm, is optimized for the desired color while movable reflective layer 6 is actuated as shown in FIG. 1B.

The partially reflective layer 5 is coated on a transparent substrate 4, through which incident light passes in. The dielectric layer 7 is coated on an electrode 9, and is intended to prevent electric shorting while the movable reflective layer 6 is at actuated state. In this embodiment, the electrode 9 is separated from the surrounding electrodes, which means the electrodes are pixelized. Their sizes may be of 1 um to 500 um depending on the applications, preferably around 15 um in the microdisplay applications. The electrodes are connected to the gate and source electrodes of MOS transistors (not shown in FIG. 1) fabricated in the underlying silicon substrate 10.

The movable reflective layer 6 comprises of typically metal layer or layers with thickness ranging from 0.05 um to 1 um, preferably around 0.2 um, and typically is of tensile stress ranging from 100 MPa to 1000 MPa, preferably around 500 MPa. The tensile stress is favored so that, at relaxed state, the reflective layer maintains flat. This is important for obtaining optima darkness at dark state. The tensile stress also provides driving force for the movable reflective layer to bounce back from its deformed state while the electrostatic force is removed. The top of the reflective layer is of highly reflective material, typically metal such as Al.

The partially reflective layer 5 is semi-transparent. It absorbs light. It may be of metal or dielectric material. Its thickness may be of 1 nm to 50 nm, preferably around 10 nm. In one embodiment, it is metal film, such as Cr, Ni, etc.

The interferometric modulator can be formed by a number of depositions and a number of selectively material removals, such as wet etch and/or dry etch, and release of some sacrificial layer.

In one embodiment, the interferometric modulator 100 shown in FIG. 1 is formed by two building blocks. The first building block comprises the transparent substrate 4 and the partially reflective layer 5, and potentially an additional layer of dielectric layer (not shown in FIG. 1) on layer 5, if layer 5 is of metal. The second building block comprises silicon substrate 10, electrode 9, dielectric layer 7, movable reflective layer 6, the cavity 14, and the supporting spacers 8 and 11. The first building block is also referred herein as backplate, and the second building block as the array plate. The backplate and the array plate can be built in parallel, and then brought together to form assembly. While these two plates are brought together, cavity 13 is formed.

In some embodiments, cavity 13 is formed by sealing the backplate and the array plate together within a low-pressure environment. The low-pressure environment ensures that, while the sealed assembly is brought to atmosphere, the external atmosphere pressure would press these two substrates against each other, to form the cavity with the gap precisely controlled by the second post structures 11.

In some embodiments, the cavity 14 is formed by depositing a sacrificial layer (not shown in FIG. 1) with desired thickness on the dielectric layer 7, and depositing the reflective layer 6 on the sacrificial layer, and then etch away the sacrificial layer to form the cavity.

In some embodiments, the movable reflective layer 6 is used as common electrode, which may be biased to a fixed voltage. While the electrode 9 of the spatial light modulator is charged to a high voltage and the potential between the electrode 9 and the movable reflective layer 6 exceeds some threshold, then the portion of the removable reflective layer 6 directly above the electrode 9 comes down to relay on the dielectric layer 7. The gap between the movable reflective layer 6 and the partial reflective layer 5 is increased and forms cavity 12. While this high voltage is removed, the movable reflective layer 6 bounces back to the flat state where the movable reflective layer is in relaxed state.

As above stated, with no voltage applied, the movable reflective layer remains at the mechanically relaxed state, and both cavities 13 and 14 remain as illustrated in FIG. 1A. In this state, the reflected light from the partially reflective layer 5 and from the movable reflective layer 6 interfere each other destructively, so a dark state is formed. However, when a voltage is applied to the electrode 9, the capacitor formed between the selected electrode and the corresponding part of the movable reflective layer becomes charged, and the electrostatic force pulls the movable reflective layer down toward the electrode. If the voltage is high enough, the movable reflective layer 6 is deformed and is pull down against the dielectric layer and forms the cavity 12 as illustrated in FIG. 1B. In this state, the reflected light from the partially reflective layer 5 and the movable reflective layer 6 interfere each other constructively, so a bright state is formed. The dielectric layer 7 prevents electrical shorting between the movable reflective layer 6 and the electrode 9. While the potential is removed, the intrinsic mechanical restoring force of the movable reflective layer pulls back the movable reflective layer to the relaxed state and the spatial light modulator appears dark again. The "on" and "off" of the potential leads to the "bright" and "dark" state of the spatial light modulator.

Figure 2:
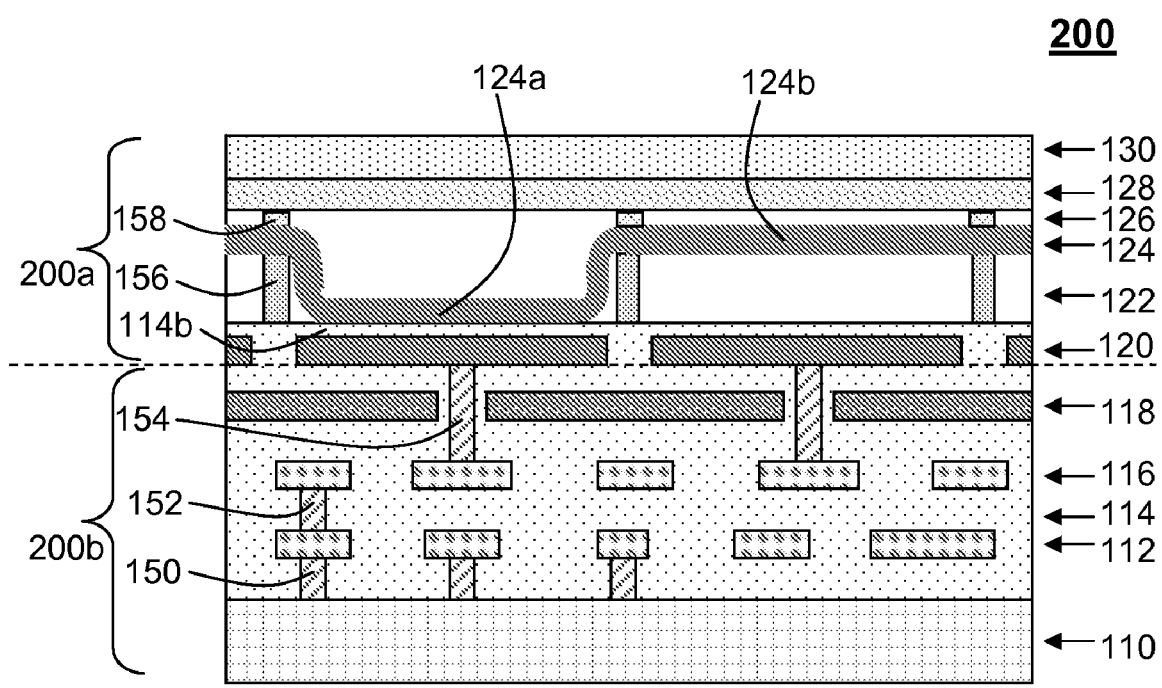
FIG. 2 shows a simplified cross-sectional view of an embodiment of a pair of spatial light modulators, wherein one modulator is in relaxed state and the other in actuated state.

FIG. 2 shows a cross-sectional view of a portion of a display apparatus 200 with a spatial light modulator array, in accordance with one or more aspects of the invention. Two spatial light modulators are depicted, with one in the right at relaxation state and the one in the left at actuation state. The difference relies on the fact that the portion of the movable reflective layer 124b of the right modulator is at relaxation state, yet the portion 124a of the left modulator at deformed state.

The spatial light modulator apparatus 200 comprise a silicon substrate 110, on which are successively provided an insulating layer 114, a cavity gap 122, a movable reflective layer 124, a second cavity gap 126, a partially reflective layer 128 and a transparent layer 130. A first metal layer 120 is provided under a layer 114b, which is a portion of the insulating layer 114. The first metal layer includes a plurality of individual electrodes. Between the individual electrodes, small light transmissive regions exist, therefore, small portion of light may leak into the MOS structures (not shown here in FIG. 2) built in substrate 110 that is beneath the individual electrodes. To block this leaked light, a second metal layer 118 is provided between the first metal layer 120 and the substrate 110. The second metal layer is, with some via holes though, preferably a continuous layer dedicated to shield light. The vias are for electric connecting purpose. They are filled with dielectric material with metal plugs 154 in the center. The metal plugs 154 connect the individual electrodes of the first metal layer 120 to the routing electric circuits beneath the second metal layer. Third and fourth metal layers, 116 and 112, are provided between the second metal layer and the substrate 110 for routing purpose; metal connectors 152 and 150, together with plug 154, are provided to connect various portions of the first, third, fourth metal layers and the MOS transistors built in the silicon substrate 110.

A plurality of integrated spacers and/or walls 156 is provided between the movable reflective layer 124 and the dielectric layer 114b. The height of the integrated spacers and/or walls 156 determines the gap of the cavity 122. Another plurality of integrated spacers and/or walls 158 is provided between the movable reflective layer 124 and the partially reflective layer 128. This plurality of integrated spacers and/or walls is built on the movable reflective layer on the direct top of the integrated spacers and/or walls 156. The height of the integrated spacers and/or walls 158 determines the gap of the cavity 126 while the movable reflective layer 124 is at relaxed state.

The spatial light modulator apparatus may be generally divided into two functional blocks: functional block 200a and functional block 200b, as depicted in FIG. 2. Based on above description, function block 200a is related to the electromechanical and optical part of the spatial light modulator and 200b is related to the IC and electric addressing part. It is assumed that the structure of part 200b is well known to those who are skilled in the art of IC industry and display industry, therefore no detailed description is provided about the process how to fabricate it; instead, portion 200a and the process of fabricating it is described in detail below.

Figure 3:
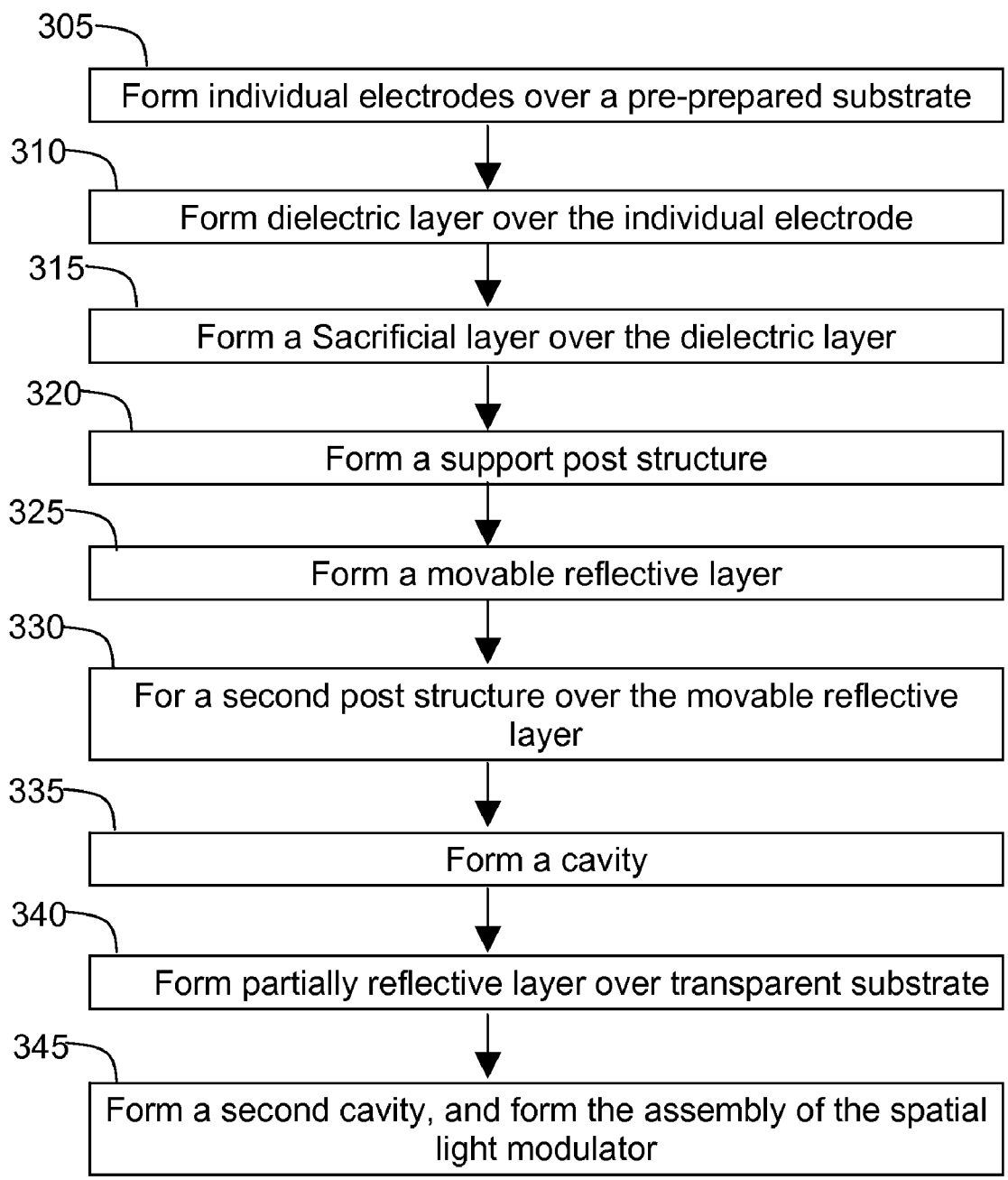
FIG. 3 shows a flow diagram illustrating an embodiment of a method of making a spatial light modulator.

FIG. 3 is a process flow diagram illustrating certain steps in an embodiment of a manufacturing process 300 for a display apparatus, referenced as 200 in FIG. 2, of an interferometric spatial light modulator array. Such steps may be present in a process for manufacturing interferometric light modulator and/or apparatus of the general type illustrated in FIGS. 1 and 2, along with some other steps not shown in FIG. 3. Meanwhile, FIG. 4A through 4K (collectively referred as FIG. 4 hereafter) schematically illustrate an embodiment of a method for fabricating such spatial light modulator and/or apparatus using conventional semiconductor manufacturing techniques such as film deposition, lithography, etching etc. As stated above, no detailed process description about functional block 200b will be given below; instead, details are given to the process of fabricating functional block 200a. For convenience, those similar building structures in FIG. 2, FIG. 3 and FIG. 4 are having the same numerical names, for example, 124 represents the movable reflective layer in FIG. 2, FIG. 3, and FIG. 4.

Figure 4A:
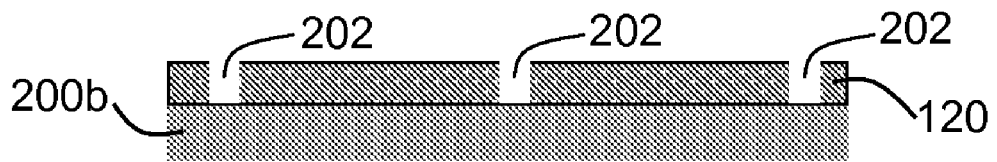
FIG. 4A through 4K schematically illustrates an embodiment of a method fabricating a spatial light modulator array.

With references to FIG. 3 and FIG. 4A, the process 300 begins at step 305 with the formation of the individual electrodes on a substrate having the building portion 200b. This includes the deposition of a blank metal film 120, referred as first metal layer, by means of sputtering, evaporation etc., and then patterning the metal layer into individual pixel electrodes using conventional lithography and wet etch or dry etch. After patterning, individual pixels are formed with trenches 202 between the individual electrodes.

Figure 4B:
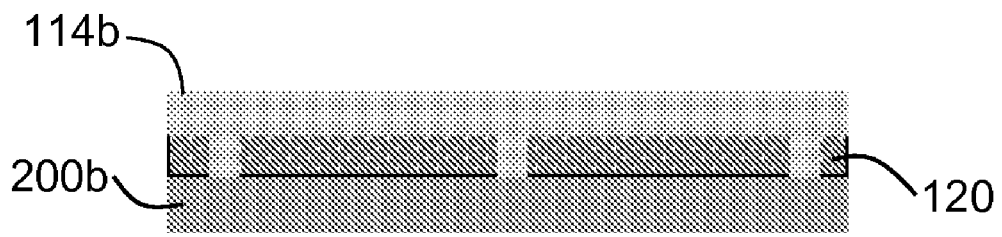

The process 300 illustrated in FIG. 3 continues at step 310 with the formation of a dielectric layer 114b on the top of the patterned individual electrodes of the first metal layer 120 as illustrated in FIG. 2 and FIG. 4B. 114b is a portion of the dielectric layer 114. This can be done by chemical vapor deposition (CVD) or TEOS, or sputtering. Layer 114b will also fill in the trenches of 202. The function of this dielectric layer is to prevent shorting between the individual electrode and the movable reflective layer while it is pull down.

Figure 4C:
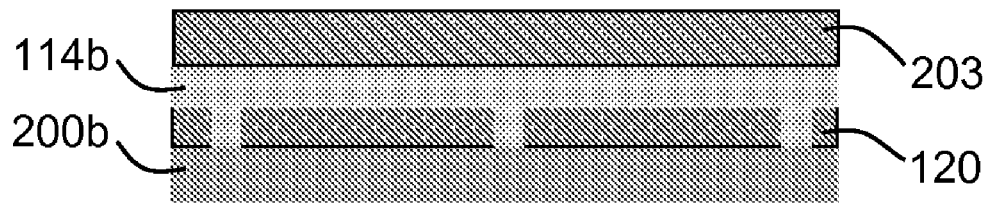

The process 300 illustrated in FIG. 3 continues at step 315 with the formation of a sacrificial layer 203 over the dielectric layer 114b as illustrated in FIG. 2 and FIG. 4C. The sacrificial layer is to be removed later at step 335 to form the cavity 122 as discussed below and thus the sacrificial layer is not shown in the resulting interferometric spatial light modulator 100 illustrated in FIG. 1, or the interferometric spatial light modulator apparatus 200 illustrated in FIG. 2. The formation of the sacrificial layer over the dielectric layer 114b may include deposition of a XeF2-etchable material such as amorphous silicon, Germanium or molybdenum, in a thickness selected to provide, after subsequent removal of the sacrificial layer, a cavity 122 having the desired gap so that proper color is formed. Deposition of the sacrificial material may be carried out using deposition techniques such as CVD, or sputtering.

Figure 4D:
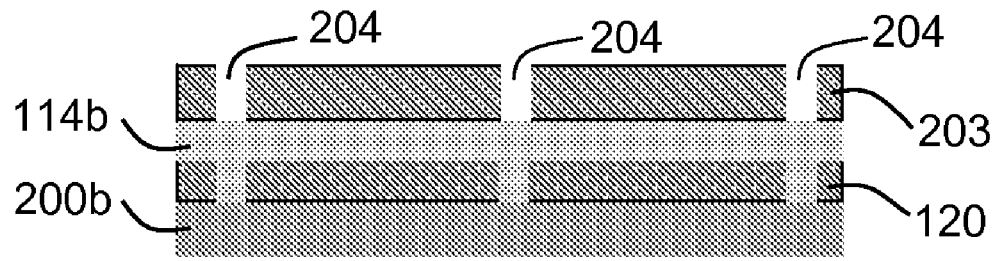
Figure 4E:
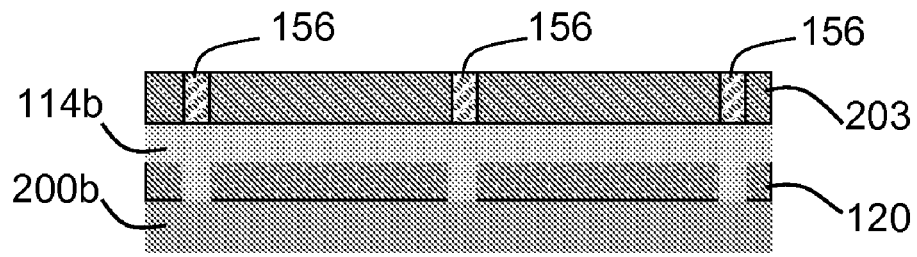

The process 300 illustrated in FIG. 3 continues at step 320 with the formation of a support post structure 156 as illustrated in FIG. 2 and FIG. 4E. The formation of the post 156 may include the steps of patterning the sacrificial layer 203 to form trenches 204 as shown in FIG. 4D, depositing a dielectric layer (e.g., SiO2) on the sacrificial layer and the trenches using a deposition method such as CVD, or sputtering, and then patterning this dielectric layer to form the post structures 156 by conventional lithography and etch. The post structures may also be formed by patterning the sacrificial layer to form the trenches 204, and then form the post structure 156 using lift-off technique. This post structure may be of plurality of round or square posts, or continuous or consecutive walls. In one embodiment, the trenches 204 formed in the sacrificial layer may only extend through the sacrificial layer so the post structure will be standing on the dielectric layer 114b after the sacrificial layer is removed, as illustrated in FIG. 2.

Figure 4F:
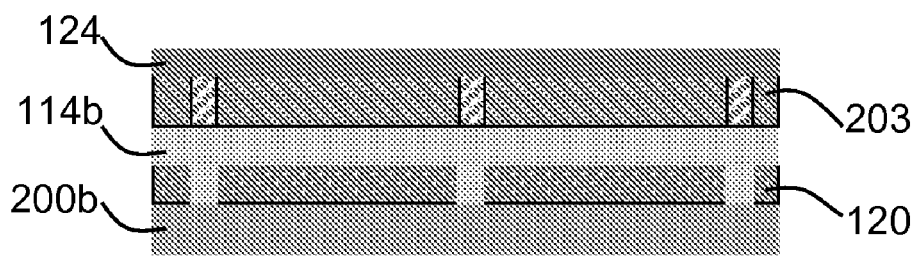

The process 300 illustrated in FIG. 3 continues at step 325 with the formation of a movable reflective layer 124 as illustrated in FIG. 2 and FIG. 4F. The movable reflective layer 124 may be formed by employing one or more deposition steps, to ensure that the reflective layer has the desired mechanical and optical properties, e.g., proper tensile stress of the layer and high reflectivity on the top surface. At this stage, the movable reflective layer is still blank film. As discussed above, the movable reflective layer 124 is typically electrically conductive, and may be used as another electrode, referred to herein as common electrode. Since the sacrificial layer is still present in the partially fabricated interferometric modulator formed at this step, the movable reflective layer 124 is typically not movable at this stage. A partially fabricated interferometric modulator that contains a sacrificial layer may be referred to herein as "unreleased" interferometric modulator.

Figure 4G:
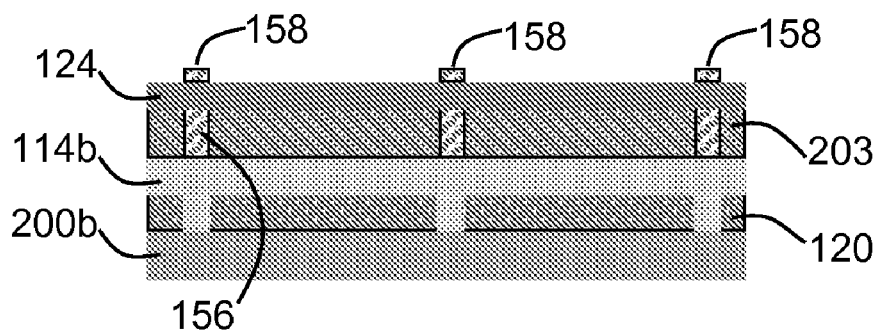

The process 300 illustrated in FIG. 3 continues at step 330 with the formation of a second supporting post structure 158 over the movable reflective layer 124 as illustrated in FIG. 2 and FIG. 4G. The post structure may be provided by depositing a dielectric layer over the movable reflective layer by means, for example, CVD, and then pattern the dielectric layer by lithography and etching to form the post structure. This post structure may be of plurality of round or square posts, or continuous or consecutive walls, and should be on or directly above the first post structure 156.

In one embodiment, the second supporting post structure is sitting on the movable reflective layer.

In another embodiment, the second supporting post structure is directly sitting on the first post structure. This is made by forming a plurality of holes or trenches in the movable reflective layer directly on the top of the first post structure, then depositing the dielectric post material on the movable reflective layer and the holes and the trenches, and then patterning the dielectric post material layer to form the post structure. This way, the second post structure is directly sitting on the first post structures, therefore assures optima hardness of the post structures.

In another embodiment, the second supporting post structure is one part of the movable reflective layer. This is made by having the height of the first supporting post structure larger than the thickness of the sacrificial layer, so, while the movable reflective layer is deposited on the top of the sacrificial layer, the removable reflective layer is higher at the first supporting post structure than else where, and that high portion of the movable reflective layer serves as the second supporting post structure.

Figure 4H:
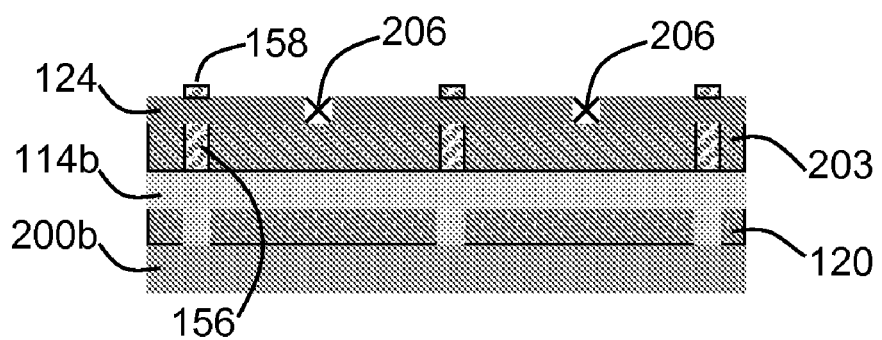
Figure 4I:
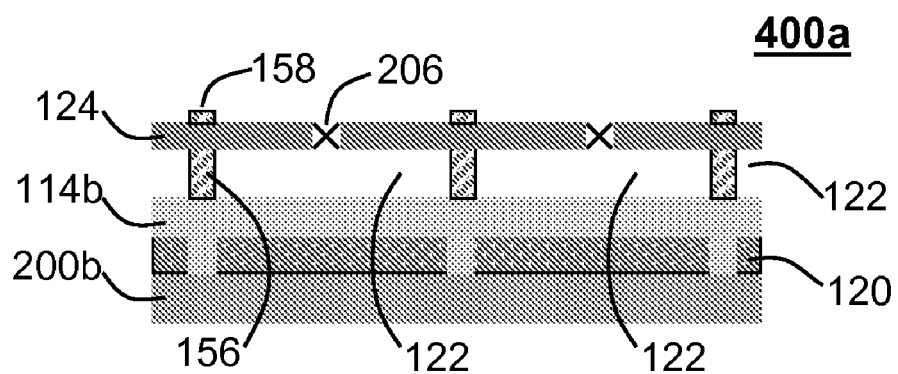

The process 300 illustrated in FIG. 3 continues at step 335 with the completion of the array plate 400A by the formation of a cavity 122 as illustrated in FIG. 2 and FIG. 4I. The cavity 122 may be formed by, first forming a plurality of releasing holes 206 in the removable reflective layer as illustrated in FIG. 4H, and then exposing the sacrificial material deposited at step 315, through the just formed releasing holes 206, to an etchant, for example, XeF2. The release holes are formed by conventional lithography followed by wet etching or dry etching. The sacrificial material, such as amorphous silicon, germanium or molybdenum, may be removed by exposing it to vapor XeF2 for a period of time that is effective to remove the desired amount of sacrificial material. To facilitate the releasing of the sacrificial layer, the etch rate of amorphous silicon, germanium or molybdenum to XeF2 should be much higher than that of the walls and the substrates surround the cavity 122. Other etching method, e.g., plasma etching, may also be used. After the sacrificial layer is removed at this step, the movable reflective layer 124 becomes truly movable now, and the resulting partially fabricated interferometric modulator may be referred herein as a "released" spatial light modulator. This "released" spatial light modulator 400A is also called "array plate".

Figure 4J:

The process 300 illustrated in FIG. 3 continues at step 340 with the formation of the backplate 400B by depositing a partially reflective layer 128 on the transparent substrate 130 as illustrated in FIG. 2 and FIG. 4J. The transparent substrate may be glass or plastic, and may have been subjected to prior preparation step(s), e.g., antireflection coating on the other surface where light incides. This antireflection coating is to reduce the specular reflection on the surface. As discussed above, the partially reflective layer may be of metal and/or dielectric material, and may be fabricated, for example, by depositing one or more of the layers on to the transparent substrate 130 by using methods such as sputtering, CVD, spin coating etc. In the case that the partially reflective layer is formed by metal material(s), a thin protecting layer of dielectric material, such as SiO2, may be deposited on the metal layer to prevent possible shorting between the partially reflective layer and the movable reflective layer. If the protecting layer is used, the height of the second post structure formed on process step 330 in FIG. 3 should also be correspondingly adjusted.

Figure 4K:
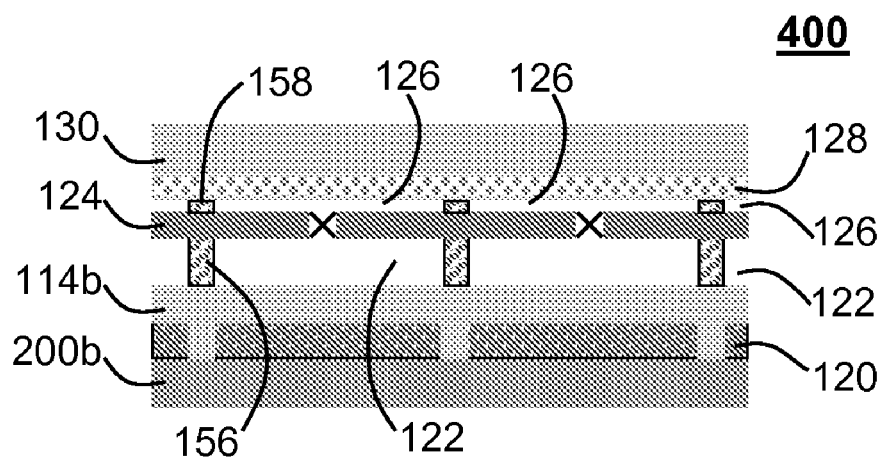

The process 300 illustrated in FIG. 3 continues at step 345 with the formation of a second cavity 126 as illustrated in FIG. 2 and FIG. 4K, and the formation of the assembly of the spatial light modulator apparatus 400. The cavity 126 may be formed by sealing together the array substrate 400A fabricated in step 335 and the backplate 400B fabricated in step 340, in an environment with pressure lower than atmosphere. After assembled in the low-pressure environment, the fabricated spatial light modulator is brought back to ambient environment. The array plate 400A and the backplate 400B are then engaged by air pressure applied on the two substrates 110 and 130. After this step, the spatial light modulator apparatus 400 is formed.

While the above brief description tells a preferred process of forming a spatial light modulator apparatus, one or more of planarization steps, such as chemical-mechanical-polishing (CMP), in-between the processing steps may be required, to ensure optimal flatness of the substrate surface before or after some process. It is also understood that various omissions, substitutions and changes to the diagraph process illustrated above may be made by those skilled in the art without departing from the spirit of the invention.

Figure 5A:
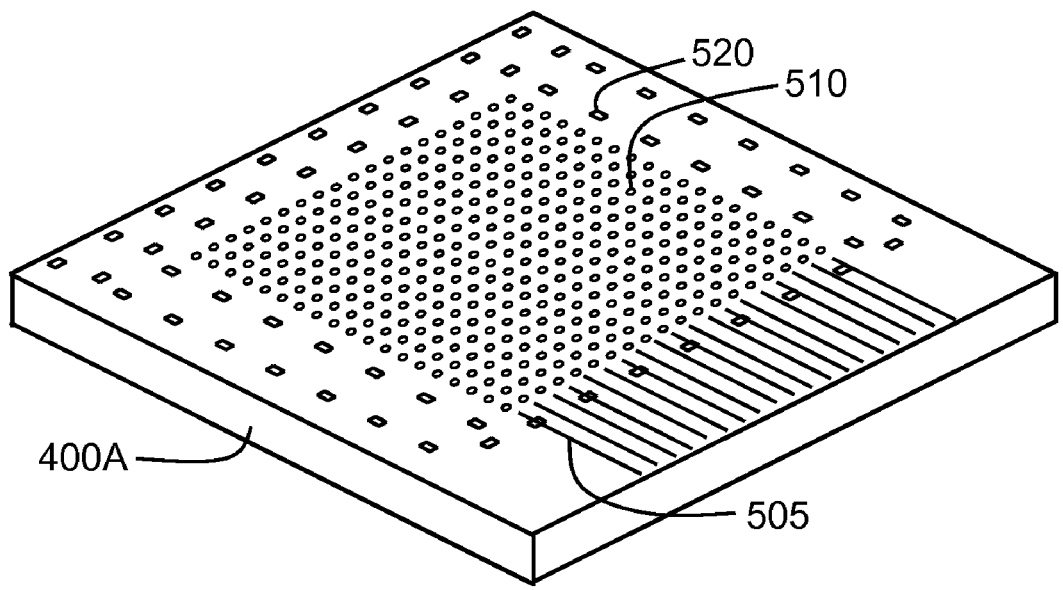
FIG. 5A illustrates a 3-dimensional view of an embodiment of an array substrate of an array of the spatial light modulators.
Figure 5B:
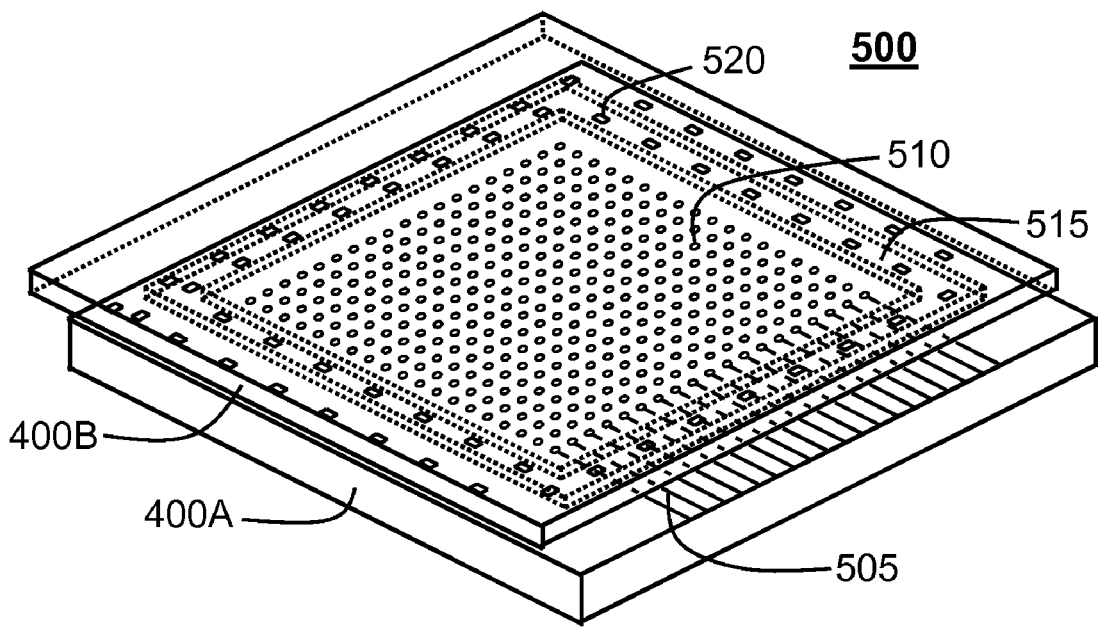
FIG. 5B illustrates a 3-dimensional view of an embodiment of a completed spatial light modulator apparatus.

To further describe the details of the step 345 in FIG. 3, FIGS. 5A and 5B, collectively referred as FIG. 5 herein, schematically illustrate an embodiment of a process of forming an apparatus of an array of spatial light modulators with two pre-formed functional building blocks: array plate 400A and backplate 400B, formed in process step 335 and process step 340.

To simplify the drawing, the array plate 400A and the backplate 400B are not shown in detail to the extent that 400A includes typical IC circuit elements such as pixel electrodes, pixel-addressing conductors, switching transistor elements etc., and typical mechanical elements of the spatial light modulators such as movable reflective layers and the supporting post structures etc, and 400B includes a transparent substrate and a partially reflective film and potentially a dielectric layer film, etc. It is important to note, that all the spatial light modulators in the array share the same movable reflective layer, which is continuous except some releasing holes.

FIG. 5A illustrates the array plate 400A of an array of spatial light modulators represented by an array of posts 510, and an array of circuit arrangements 505, and another array of posts 520. The posts 510 are the same structure 158 referred in FIG. 2 and FIG. 4. The posts are sitting at the corners of each spatial light modulator (not shown here). The number of the posts may be of 4 to a few millions, corresponding to therefore the number of the spatial light modulators of 1 to a few millions. These posts define the gaps of the cavities 126 as shown in FIG. 2 and FIG. 4. Each of these posts is formed of an incompressible material, such as SiO2 or Si3N4, whose thickness does not change significantly upon pressing, relative to a desired tolerance for the gaps of cavities 126. It should be noted that the gaps of the cavities 126 may be of same height, or may be of different desired heights, depending on the applications, to modulate incident lights of various wavelengths. This is particularly important in display related application as described later where multiple colors may be required, as easily understood by those skilled in the art.

The illustrated circuits 505 are circuitry for row and column electrode selection and circuitry for converting image signals to an electric signal recognizable by the spatial light modulator array. Typically, the circuits 505 are formed as multi layer integrated circuits and are interconnected by conductive tracks or plugs (not shown here) in the silicon substrate of array plate 400A.

The illustrated posts 520 are sitting in the periphery of the array of spatial light modulators. They may be of different shape and density of those of 510, and they are of the same height. They help to keep uniform gap between the array plate and the backplate while both plates are pressed together.

FIG. 5B illustrates a completed spatial light modulator apparatus 500. The apparatus has a backplate 400B attached to the array plate 400A by a layer of sealant 515. 400B is the backplate comprising of a transparent substrate and a partially reflective layer deposited on the transparent substrate, and potentially a dielectric layer on the top of the partially reflective layer. The transparent substrate has a thermal coefficient of expansion close or equal to the substrate of the array plate 400A. The sealant is deposited on the surface of the array plate 400A or the backplate 400B prior to the assembling of them. The sealant may be of conventionally used epoxy, solder, or other low-melting alloy etc. The sealant is deposited in such a way, that it surrounds the spatial light modulator array without getting into the array area, that it allows for lateral expansion as the array plate and the backplate are compressed together, and holds the array plate and the backplate together while being solidified. The sealant serves two purposes: one is to isolate the inner chamber from the outside environment, such as moisture; the other is to keep the low pressure of the inner chamber so that the backplate 400B will be always pressed against the post structures on array plate 400A and maintain the gap of the cavity.

In one embodiment, the spatial light modulator apparatus shown in FIG. 5B is a direct-view display, which has some other accessory parts not shown here such as driver which is connected through the circuits 505. Such accessory parts should be easily understood by those skilled in the art. Such direct-view displays may have pixels up to a few millions, and the size of each pixel may be of a few microns to a few hundreds of microns.

In another embodiment, the spatial light modulator apparatus shown in FIG. 5B is a microdisplay. Such microdisplays may have pixels up to a few millions, and the size of each pixel may be of a few microns to a few tens of microns.

Figure 6:
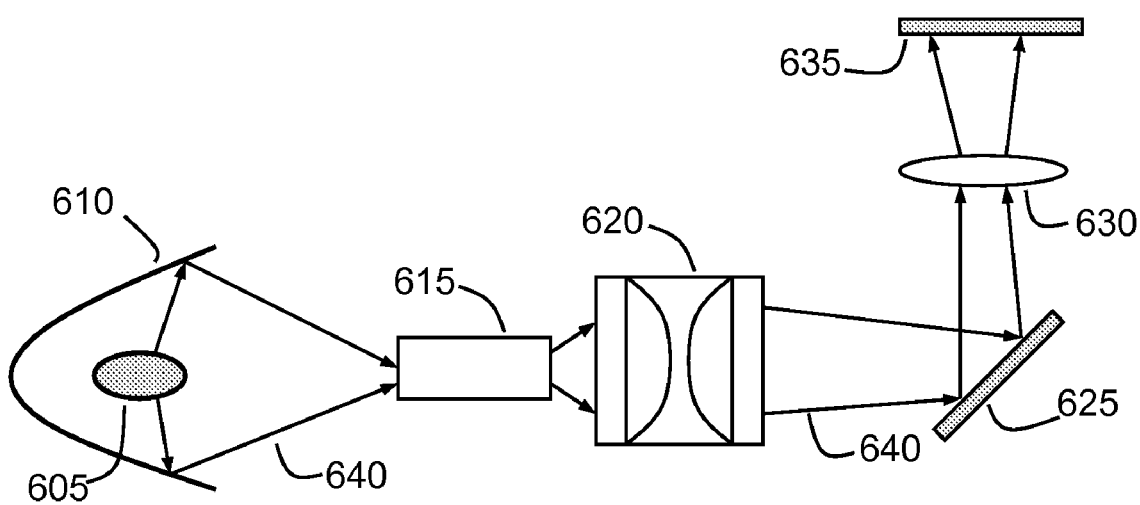
FIG. 6 is a system block diagram illustrating an embodiment of a projection display comprising a plurality of the invented spatial light modulators.

In another embodiment, the spatial light modulator apparatus shown in FIG. 5B is a microdisplay apparatus in a projection display system. FIG. 6 is a schematic illustration of such a projection display system that employs such microdisplay apparatus as shown in FIG. 5B. The projection display system comprises of a light source, for example an arc lamp 605 with reflector 610, a light pipe 615, integrated optics 620, and a display apparatus of spatial light modulators 625, optics 630 and a projection screen 635. For convenience, some arrows 640 are used to represent light rays coming out of the light source and reaching the projection screen. The display apparatus 625 comprises the imaging part as that of apparatus 500 in FIG. 5B, the driver part, the power supply, and many other accessory parts. Those components should be easy to be understood by those skilled in the art, so the details are not shown here.

In another embodiment, the spatial light modulator apparatus shown in FIG. 5B is an array of optical switches, which has some other accessory parts such as electronic controlling system, which is not shown here. Each spatial light modulator in the apparatus is a switch, and the size of each switch can be of a few microns to a few millimeters. The number of the switches in the array can be from one to a few millions.

Figure 7:
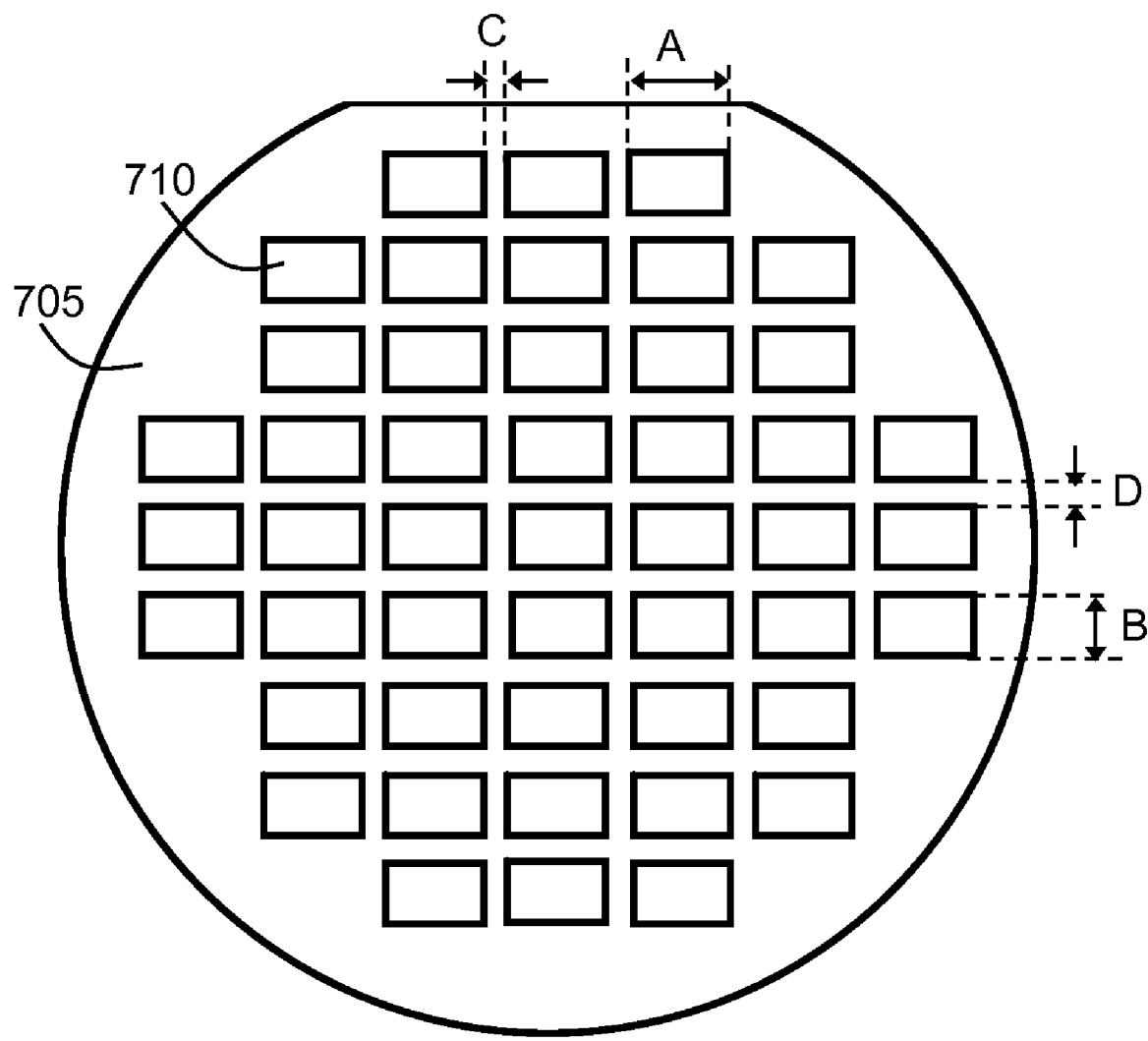
FIG. 7 illustrates an embodiment of a plurality of arrays of spatial light modulators on a silicon wafer.

FIG. 7 schematically illustrates one embodiment of an example layout of the spatial light modulator apparatuses as shown in FIG. 5B on a wafer. The silicon wafer 705 may be of different size, such as 8 inches or 12 inches. There are total of 47 example apparatuses (called die herein) on the wafer, each die 710 may be a spatial light modulator apparatus as that of 500 in FIG. 5B comprising of an array of spatial light modulators. Each die has dimensions A and B, and the distances between dies are C and D. C and D may be of such a value that the scribing or singulation will not affect the dies. It is understood that dimensions A, B, C and D vary with the design of the apparatus, and the total number of the apparatuses may be changing correspondingly, from one to a few thousands.

Figure 8A:
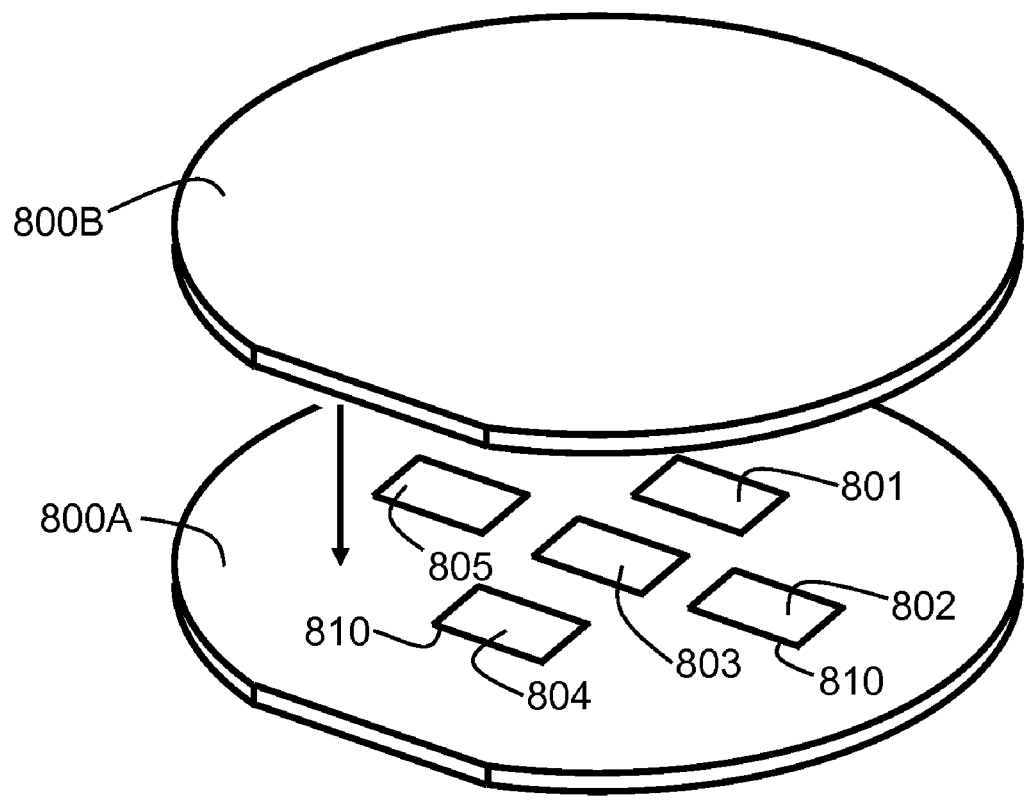
FIGS. 8A and 8B illustrate an embodiment of a wafer-scale assembly process.
Figure 8B:
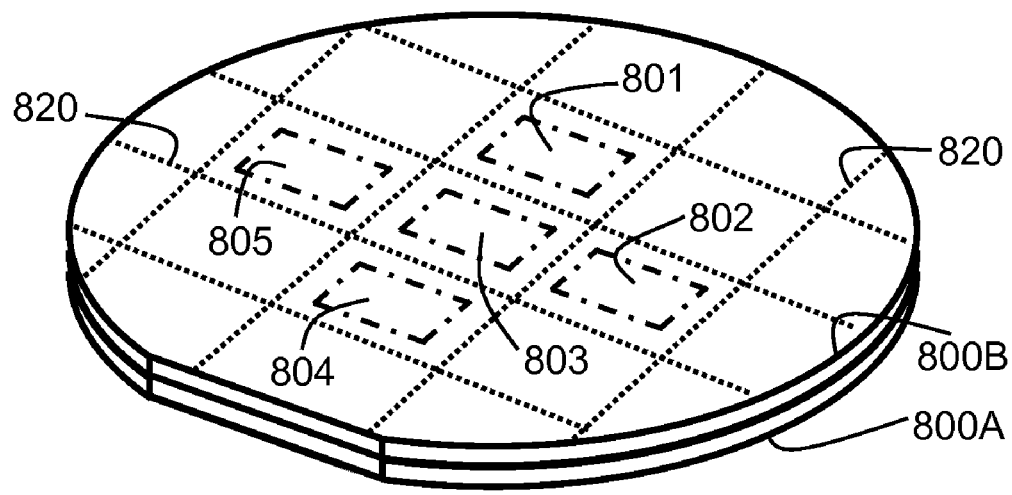

FIGS. 8A and 8B (collectively referred as FIG. 8 hereafter) schematically illustrate an embodiment of a wafer-scale assembling process. Array plate 800A and backplate 800B are to be attached to form an array of spatial light modulator apparatuses. For ease of illustration, only five dies 801, 802, 803, 804 and 805 are shown on array plate 800A, although many more dies may be formed on one array plate in most circumstances. Each die has an array of spatial light modulators that are already released. Sealants 810 are dispensed around each die. The sealants here are of closed form, yet they may be of different forms depending on designs, such as open at dispensing yet self-closed at pressing, or open at dispensing and pressing yet followed with endsealing. The backplate 800B, having structure similar to that of 400B, comprises of a transparent substrate and a partially reflective layer and potentially a dielectric layer on the partially reflective layer.

The array plate 800A and backplate 800B are brought into contact with each other in an environment of lower pressure than atmosphere. The substrates are pressed against each other so that the posts 510 and 520, referred in FIG. 5, all are in direct contact with the backplate 800B. During pressing, the sealant will expand. At the end of pressing, the sealant is solidified by a way determined by the property of the sealant material, for example, UV curing for UV epoxy. FIG. 8B shows such a bonded assembly. Once the wafers are bonded together forming a wafer assembly, the assembly may be separated into individual dies. The dies are separated in such a way that the pads for electric connection on each die are exposed, so that the connections can be made between the connecting pads and a connector, such as flex, of a driving electronics. In one embodiment, the separation is done by scribing the glass wafer and sawing the silicon wafer. The scribing positions are illustrated by the dotted lines 820 in FIG. 8B. After scribing and sawing, the wafer assembly is singulated by various methods easily understood by those skilled in the flat panel display industry. After singulation, the individual dies will have the similar appearance to apparatus 500 in FIG. 5B.

In another embodiment, both glass and silicon substrates may be partially sawed prior to die separation, and then the wafer assembly is singulated. In another embodiment, both glass and silicon substrates may be scribed prior to singulation, and then the wafer assembly is singulated. In both embodiments, the scribing or sawing lines can be of the similar configuration as shown in FIG. 8.

While the above detailed descriptions have shown novel features of the invention in various embodiments, it is understood that various omissions, substitutions, and changes may be made to the forms and details of the illustrated devices or processes by those skilled in the art without departing from the spirit of the invention. Many variations in light of the described embodiments herein will be appreciated by those skilled in the art.

What is claimed is:

1. A method of manufacturing an interferometric modulator array, the method comprising:
   providing a first substrate;
   depositing a partially reflective layer on the first substrate;
   providing a second substrate;
   forming one or more dies on the second substrate, each die comprising at least a portion of one interferometric modulator, wherein forming the one or more dies comprises
      forming an electrode over the second substrate,
      forming a dielectric layer over the electrode,
      forming a first supporting spacer over the dielectric layer,
      forming a movable reflective layer over the first supporting spacer, and
      forming a second supporting spacer over the movable reflective layer; and
   joining the first substrate to the second substrate to form a cavity between the partially reflective layer of the first substrate and the movable reflective layer of the second substrate.

2. The method of claim 1, wherein the partially reflective layer contacts the second supporting spacer after the first substrate and the second substrate are joined.

3. The method of claim 1, wherein the second substrate is a silicon wafer.

4. The method of claim 3, wherein the silicon wafer comprises one or more integrated circuits.

5. The method of claim 4, wherein the silicon wafer further comprises one or more conductive plugs configured to connect the one or more integrated circuits.

6. The method of claim 4, wherein each integrated circuit comprises one or more pixel electrodes, one or more pixel-addressing conductors, and one or more transistor switches.

7. The method of claim 1, wherein forming one or more dies on the second substrate further comprises integrating one or more metal oxide semiconductors into the second substrate.

8. The method of claim 1, wherein joining, comprises placing sealant around the one or more dies and pressing the first and second substrates together.

9. The method of claim 8, wherein joining further comprises joining the first substrate to the second substrate in a low pressure environment, such that one or more cavities of low pressure are formed between the first and second substrates.

10. The method of claim 8, wherein the sealant is in open form before pressing and in closed form after pressing.

11. The method of claim 8, wherein the sealant comprises a substance that solidifies after the first and second substrates are pressed together and isolates the one or more dies from the ambient environment.

12. The method of claim 11, wherein the sealant comprises epoxy.

13. The method of claim 12, wherein joining further comprises moving the joined first and second substrates from the low pressure environment to an ambient atmospheric pressure environment.

14. A method of manufacturing an interferometric modulator display device, the method comprising:
   forming an array plate, wherein forming the array plate comprises
      forming an electrode over the array plate,
      forming a dielectric layer over the electrode,
      forming a first supporting spacer over the dielectric layer,
      forming a movable reflective layer over the first supporting spacer, and
      forming a second supporting spacer over the movable reflective layer;
   forming a backplate comprising a substrate and a partially reflective layer deposited thereon; and
   sealing the array plate to the backplate to form a cavity between the partially reflective layer of the backplate and the movable reflective layer of the array plate.

15. The method of claim 14, wherein the array plate and the backplate are formed sequentially.

16. The method of claim 14, wherein the array plate and the backplate are formed in parallel.

17. The method of claim 14, wherein the partially reflective layer contacts the second supporting spacer after the backplate and the array plate are sealed.

18. The method of claim 14, further comprising forming a third support structure on the array plate, wherein the third support structure is configured to maintain a uniform distance between the sealed array plate and the backplate.

19. The method of claim 14, further comprising applying sealant to the array plate or backplate before sealing the array plate to the backplate.

20. The method of claim 14, wherein the array plate and the backplate are sealed in an environment at an atmospheric pressure lower than ambient atmospheric pressure.

21. The method of claim 20, wherein sealing the array plate to the backplate further comprises moving the sealed plates from the low pressure atmosphere to an ambient environment.

\* \* \* \* \*

UNITED STATES PATENT AND TRADEMARK OFFICE
CERTIFICATE OF CORRECTION

PATENT NO. : 7,629,197 B2
APPLICATION NO. : 11/539630
DATED : December 8, 2009
INVENTOR(S) : Qi Luo and Qiuxian Tai It is certified that error appears in the above-identified patent and that said Letters Patent is hereby corrected as shown below:

On the Title Pg, Item 57, Line 5, change "electromechanical" to --electro-mechanical--.

At Page 3, Item 56, Line 11, under other publications, change "Liquivista" to --Liquavista--.

At Column 2, Lines 15-16, change "electromechanical" to --electro-mechanical--.

At Column 2, Line 34, change "electromechanical" to --electro-mechanical--.

At Column 2, Line 63, change "XeF2." to --$XeF_2$.--.

At Column 6, Lines 53-54, change "electromechanical" to --electro-mechanical--.

At Column 7, Line 40, change "XeF2" to --$XeF_2$--.

At Column 7, Line 51, change "SiO2)" to --$SiO_2$)--.

At Column 8, Line 50, change "XeF2." to --$XeF_2$.--.

At Column 8, Line 54, change "XeF2" to --$XeF_2$--.

At Column 8, Line 57, change "XeF2" to --$XeF_2$--.

At Column 9, Line 13, change "SiO2," to --$SiO_2$,--.

At Column 10, Line 2, change "SiO2 or Si3Nr," to --$SiO_2$ or $Si_3N_4$,--.

At Column 12, Line 52, in Claim 8, change "joining," to --joining--.

Signed and Sealed this

First Day of June, 2010

David J. Kappos
*Director of the United States Patent and Trademark Office*